Oct. 11, 1966

E. BROMBACH ET AL
FLYING SHEAR WITH OPPOSITELY DRIVEN KNIVES PROVIDED ON A SWING FRAME 3,277,759

Filed Feb. 2, 1965

INVENTORS
ERNST BROMBACH &
ALBERT KIRCHNER

BY

*Henry C. Westin*

THEIR ATTORNEY

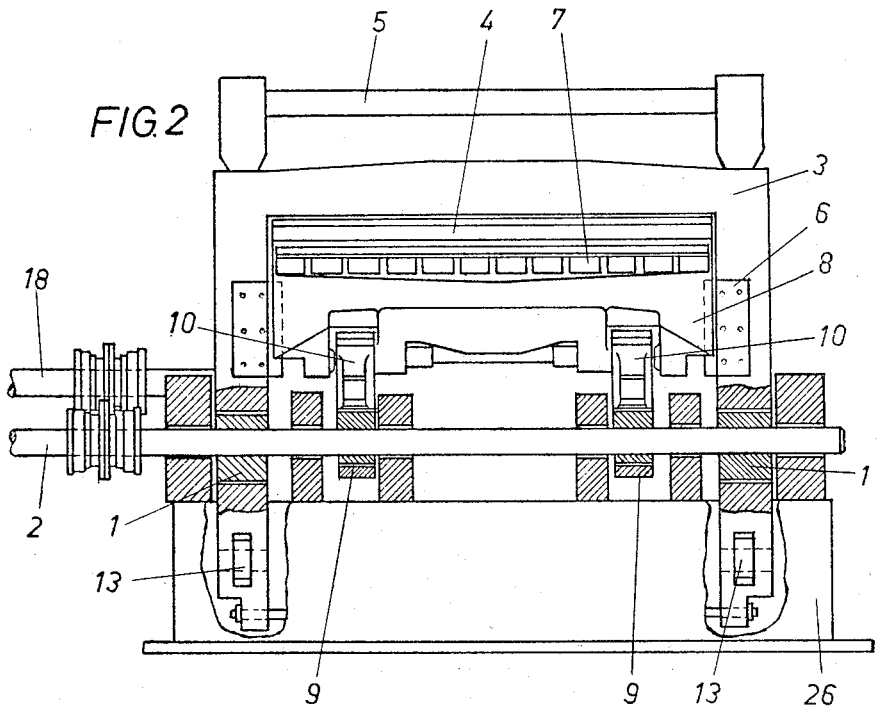
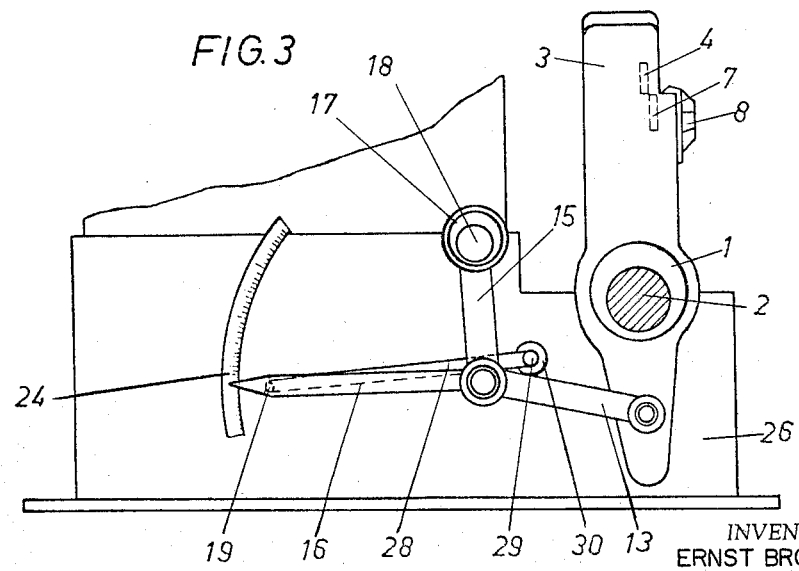

United States Patent Office 3,277,759
Patented Oct. 11, 1966

3,277,759
FLYING SHEAR WITH OPPOSITELY DRIVEN
KNIVES PROVIDED ON A SWING FRAME
Ernst Brombach and Albert Kirchner, Dahlbruch, Kreis
Siegen, Germany, assignors to Siegner Maschinenbau
G.m.b.H., a corporation of Germany
Filed Feb. 2, 1965, Ser. No. 429,790
Claims priority, application Germany, Feb. 5, 1964,
S 89,384
7 Claims. (Cl. 83—311)

The invention relates to a so-called flying shear having shear knives driven oppositely by means of continuous cranks or eccentrics operating staggered against one another by 180°, the upper knife being fixed to a crossbeam of the swing frame and the lower knife being guided on a movably arranged bottom knife beam in corresponding guides of the side cheeks of the swing frame. By means of one or several drive shafts having eccentrics the swing frame, and through connecting rods the bottom knife, are moved periodically in opposite directions.

Such shears have proven themselves for the subdividing of moving cutting stocks, bands consisting of metal or other materials. In this connection it is essential to synchronize the drives of the feeding device provided for the cutting stock and of the swing frame and thereby also of the shear knives in such a manner, that at least during execution of the cut in the traveling cutting stock, the knives arranged in the swing frame are shifted forward in the moving direction of the cutting stock at the same rate of speed at which the cutting stock advances.

This synchronized condition has been previously obtained through the fact that both the rate of feed of the cutting stock and the cutting frequency of the shear knives are variably controlled in a certain dependence of one another. For instance, the variable rate of feed can be effected by a corresponding adjustable reducing gear train, which most often is designed as an infinitely variable speed transmission and so arranged that its driving speed is through a differential gear superimposed to the speed of the actual transmission gear of the conveying device and the exact conveying speed required for the operation of the flying shear can be adjusted. The change in the cutting frequency is with the usual arrangements achieved through a number of selectively connectable reducing ratios in the drive transmission of the swing frame. Through corresponding adjustment of the rate of feed and the cutting frequency, predetermined lengths of the cutting stock, sometimes called base lengths, can be severed with the shear. If sectional lengths exceeding the adjustable base lengths are required, arrangements are made by means of a special reducing gear associated with the bottom knife to effect a one-time or multiple discontinuance or miscut of the cutting operation after each cut, whereby the adjusted base length is doubled or correspondingly multiplied.

Referring still to prior shears, through the drive of the swing frame itself by means of eccentrics, a periodic movement of the swing frame was effected with each revolution of the main drive shaft, at which the top knife fixedly mounted in the swing frame describes an elliptical path, whose foci lie within a horizontal and whose lowest point is reached above the traversing plane for the cutting stock. The lower knife was actuated by the main drive shaft or by an additional drive shaft through one or several eccentric sleeves. In some known shears there are arranged in the main transmission on the drive shafts for the lower and upper knife several on and off switchable sets of gears, whose numbers of teeth are so synchronized that bringing together of the top and bottom knife occurs in dependence of the adjustment with each swing of the swing frame or also with every second, third, fourth, fifth or sixth swing. If the cutting process is carried out with each swing of the swing frame, the lower knife, too, describes approximately a horizontally elongated elliptical shaped path, the highest point of which is far enough above the traversing plane of the cutting stock so that the paths of both knives overlap for the performance of the cut.

In order to adapt the horizontal component of the speed of the knives during the cut to the advance speed of the cutting stock, devices are provided in the known shears, which by changing essentially the horizontal component of the swings performed by the swing frame, adapt the speed of path of the knife edges during the passing by of the path sections associated with the cutting process to the advance speed of the cutting stock. With the known shears of this type the change in the horizontal component is effected by a toothed rack actuated by the main drive shaft of the swing frame by means of a guide plate, which through a pinion shifts a differential shaft with eccentrics associated with the latter. Connecting rods arranged on the eccentric or eccentrics engage on the swing frame and determine the prevailing position of its swivel axis and by reason of their periodic horizontal movement in association with the eccentric drive, the track curve traversed by the knives provided on the swing frame. Through corresponding link adjustment the swing amplitude executed in the horizontal direction can be determined and therewith the knife speed can be adapted to the speed of the cutting stock.

In the above shearing arrangement there is the drawback that in order to set a new base length and thereby a new amplitude ratio in the swing of the swing frame, the shear, to permit making the adjustment, must be stopped in a certain position resulting in not inconsiderable stoppage times and thereby also loss in production. With the heavy loads occurring through the periodical accelerations of the shear masses, there will be an enormous stress on the cooperating machine parts, especially the toothed rack and the eccentric pinion, which are subject to greater wear. In order not to increase still further the considerable expenditure, the link or guide plate, the toothed rack and the pinion are provided on only one side which results in a higher unsymmetrical load necessitating further stiffening of the machine frame and, possibly, of the swing frame and therewith increased expenditures.

In order to remedy at least some of the drawbacks of this known arrangement, suggestions have been made to replace the toothed rack and the eccentric pinion by extensive spur wheel and differential gearings. While it is true that this made it possible to simplify the shift to other swing amplitudes, the required expenditures were increased considerably, and maintenance of the shear was made more difficult through the complicated setup.

The present invention provides an adjusting device for the swing amplitude of the swing frame which with a minimum of expenditures and easily understandable setup can be manipulated without difficulty even while the machine is running. This is achieved according to the invention through the fact that the swing frame is hinged by means of a control lever to the free end of a laterally engaging connecting rod actuated by a cam shaft running synchronously with an eccentric shaft driving the swing. The junction point of the two parts mentioned is guided by an additional control lever forming together with the first one a toggle lever and whose swivel point, for the setting of variable transmission ratios of the toggle lever mechanism, is shiftable. In connection herewith it turned out to be advantageous to arrange the toggle joints on both sides and let the cam shaft have two cams, so that periodically the swing is driven additionally on both sides through identical lever systems.

In certain cases it is recommendable to maintain the second control lever pivoting round a pin adjustably shiftable along a straight guide. On the other hand, however, the axis of rotation of the control lever can also be provided on a lever swiveling round a stationary pin and be shiftable with the horizontal swing of said lever. In connection therewith it turned out to be recommendable for the fixedly mounted levers provided on both sides of the shear to be interconnected by a common shaft. The adjusting device in this case can engage both levers, one of the levers or also an additional lever provided on the pin.

It may be advantageous to perform the shift in the straight guide or guides and/or the swivel of the fixedly mounted levers by means of a threaded spindle and nut either by hand or electrically. On the other hand, servomotors actuated by a pressure medium can also be used to perform the prevailing adjustments either pneumatically or hydraulically.

The above features of the present invention which are now explained in connection with the accompanying drawings of which:

FIGURE 2 represents a sectional view along the plane of lines A–B of FIGURE 1 through the main drive shaft provided to actuate the top and bottom knives; and FIGURE 3 is a view of a modified embodiment of the shear, shown in FIGURE 1, wherein the swivel axis of the second control lever is shiftable through an additional rocking lever.

Figure 1:
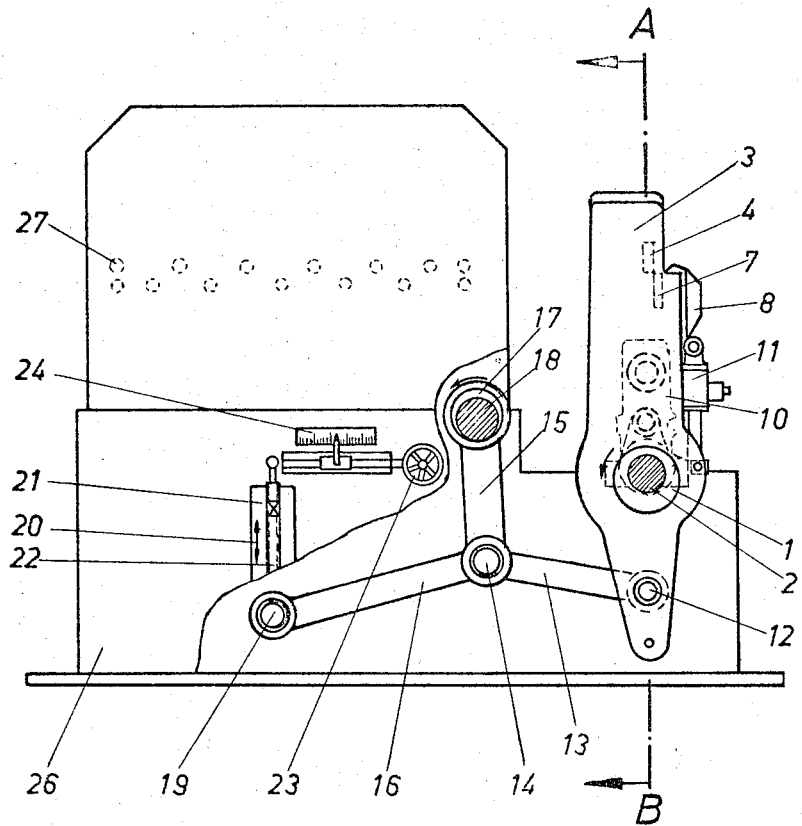
FIGURE 1 is a view of a shear, including a toggle lever system provided to adjust the blade speed.

With reference to FIGURE 1 there is illustrated a swinging shear frame 3, hereinafter referred to as "swing," mounted on eccentrics 1 of a main drive shaft 2. While, as shown in FIGURE 2, a top knife 4 is fixedly mounted on an upper knife beam 5 in the swing 3, a lower knife beam 8 carrying a bottom knife 7 movably arranged in guides 6 of the side cheeks of the swing 3 is actuated through additional connecting rods by means of eccentrics 9 arranged on the main drive shaft 2 and staggered by 180° in relation to the eccentrics 1. The lower knife beam 8 encompasses the eccentrics 9. With the revolution of the main drive shaft 1, there are put into motion periodically in opposite directions the top knife 4 arranged on the upper knife beam 5 of the swing 3 and the bottom knife 7 provided on the lower knife beam 8, and thus arrive in the cutting position, whenever the top knife passes through the lowermost part and the bottom knife through the highermost part of its track.

To achieve greater cutting lengths, there is associated with the drive mechanism of the bottom knife a device 11 for the performance of miscuts which in the embodiment brings about a deflection or deviation of the two-part connecting rods 10 actuating the bottom knife beam 8, so that when the apparatus goes into action, the eccentrics 9 provided for the drive of the bottom knife beam do indeed actuate the connecting rods 10, but the latter, because of their bent-inward positions, do not convey the transmitted stroke to the bottom knife beam and the bottom knife remains essentially in its basic position, so that there will be no cut.

To determine the moving track of the swing 3, the latter's free ends are equipped with hinge joints 12 with which control rods 13 engage. The opposite ends of the control rods 13 are connected by means of double swivel joints 14 with connecting rods 15 and second control rods 16. The connecting rods 15 are actuated through eccentrics 17 of a differential shaft 18 operated in fixed relation to the speed of the main drive shaft 2, preferably driven at the same speed through a common gear system. The free ends of the control rods 16 are pivotable about bearing pins 19, which during operation of the shear remain stationary, but they can be shifted by means of adjusting devices 20 for the purposes of setting different swivel widths. In the embodiment illustrated the adjusting devices are developed as guides 21, along which, under the effect of screw spindles 22 running in nuts, the bearing pins 19 are adjustably shiftable. The drive occurs through a handwheel 23 which acts through shaft connections upon the screw spindles 22. By means of an indicator provided on a threaded connecting shaft, the occasional adjustment for the horizontal swing can be read on the scale 24, i.e., the swivel width can be set on the basis of the scale.

During operation, the turning of the differential shaft 18 through its eccentrics 17 and the connecting rods 15 brings about a periodical movement of the control rods 13 and 16 developed as toggle levers. In this connection the two control rods support themselves on the bearing pins 19 held secure during the working process of the shear, so that the straight and angular formation of the control rods 13 and 16 acting as toggle levers causes an essentially horizontal shift of the swivel joint 12 of the swing 3. This additional motional component, effective practically only in a horizontal direction, may, depending on its phase position, change the ellipse brought about through the eccentric 1 by reason of the drive of the swing 3, whereby its vertical component remains essentially unchanged, whereas on the other hand the horizontal component can be increased or decreased depending on the phase position of the additional movement. By shifting the bearing pins 19 by means of the adjusting device 20, the kinetic conditions of the mechanism formed from the control rods 13 and 16 and the connecting rod 15, and thereby also the stroke transmitted by the control rod 13 to the swing 3, can be changed within wide limits, so that it is possible to adjust the horizontal amplitude of the oscillation or elliptic path executed by the upper end of the swing. With the given frequency of the drive, however, a change in the contour of the track also means a change in the track speed, so that the speed of the upper knife edge in the cutting range can be adapted to the rate of feed of the cutting stock by actuating the adjusting device.

Represented in the embodiment of FIGURE 1 and, particularly, in the upper part of the base frame 26 are parts of the conveying system 27, such as, straightening and drive rolls.

The modified embodiment of the invention, shown in FIGURE 3, has the same reference numerals for the identical parts found in FIGURES 1 and 2. The swivel bearing of the control rods 16 is not shiftable here in a straight guide corresponding to the guide 21, the shifting is brought about here by the horizontal swing of an additional, fixedly mounted pair of levers 28. In this embodiment the two levers 28 are provided on a connecting shaft 29 maintained in bearings 30 of the base frame 26. In this case, while not shown, an adjusting device is provided in the form of a pressure medium, actuated servomotor which engages with an adjusting lever provided on the connecting shaft 29.

It will be appreciated that the driving apparatus and the type of drive are not limited to those shown in the examples. Thus, the adjustment could also be made occasionally by a pair of toggle levers, and the drive itself can be made effective pneumatically or hydraulically, or the adjustment can be performed electrically by means of a screw spindle with associated guide nut or also be a worm engaging with a gear segment. Moreover, there may be provided manual adjustment of the machine itself and, if necessary, additional adjustment can be effected by a power-driven arrangement from the control pulpit after preselection. In either case, a relatively simple setup of the apparatus is provided for adjusting the horizontal component of the track of the top knife, and the adjustment can also be performed with the machine running, so that changes to other cutting stock lengths can be quickly and easily performed. The scales coupled with the adjusting apparatus facilitate adjustment to predetermined or interpolated values and it is also possible at any time, with the machine running, if such should be necessary, to perform slight corrections for accurate adaptation to the prevailing rate of feed of the cutting stock.

In accordance with the provisions of the patent statutes, we have explained the principle and operation of our invention and have illustrated and described what we consider to represent the best embodiment thereof. However, we desire to have it understood that within the scope of the appended claims, the invention may be practiced otherwise than as specifically illustrated and described.

We claim:
1. In combination with a flying shear having an oscillatable frame,
  an upper knife carried by said frame,
  a drive shaft,
  a first eccentric carried by said drive shaft and connected to said frame,
  a lower knife guided in said frame and movable relative thereto towards and away from said upper knife,
  a second eccentric carried by said drive shaft and connected to said lower knife,
  said first and second eccentrics disposed 180° apart,
  means for feeding stock to said shears,
  a device for adjusting and controlling the knife path of at least one of said knives comprising:
  a control rod connected to said frame at a location adjacent, but to one side of the eccentrics, wherein the connecting point of said frame and control rod with respect to said eccentrics form a relatively small lever,
  a connecting rod connected to said control rod,
  a cam shaft connected to and for displacing said connecting rod,
  said cam shaft being driven at a speed substantially synchronous with the feeding speed of the stock,
  a third rod connected at its one end to the connecting point of said control rod and connecting rod and at its other end to a shiftable swivel point,
  said control rod and said third rod forming a toggle the effective length of which is controlled by displacement of said connecting rod.

2. A device, according to claim 1, wherein said cam shaft has two cams, a connecting rod for each cam and a toggle system connected to each connecting rod for displacing said frame.

3. A device, according to claim 2, wherein the shiftable swivel point of the third rod is mounted on a lever supported by and adjustable about a stationary pin,
  said shiftable swivel point being displaceable with the horizontal swing of said lever.

4. A device, according to claim 3, including a second lever to which said shiftable swivel point is connected,
  said second lever supported and adjustable about a stationary pin,
  said two levers being interconnected and arranged on opposite sides of said shear.

5. A device, according to claim 4, wherein said adjustable shiftable swivel points are received in straight guides,
  and are adjustable by means of a rotatable screw.

6. In a shear, according to claim 5, wherein said rotatable screws are driven simultaneously.

7. A device, according to claim 1, wherein said shiftable swivel point of said third rod is received in a straight guide.

References Cited by the Examiner

UNITED STATES PATENTS

| | | | |
|---|---|---|---|
| 1,996,617 | 4/1935 | Hahn | 83—305 |
| 2,144,308 | 1/1939 | Hallden | 83—305 |
| 2,258,339 | 10/1941 | Sieger | 83—311 |
| 2,410,555 | 11/1946 | Stevens | 83—316 X |
| 2,436,572 | 2/1948 | Henschker | 83—316 X |
| 2,829,713 | 4/1958 | Nilsson | 83—316 X |

WILLIAM W. DYER, Jr., *Primary Examiner.*

J. M. MEISTER, *Assistant Examiner.*